Patented June 1, 1926.

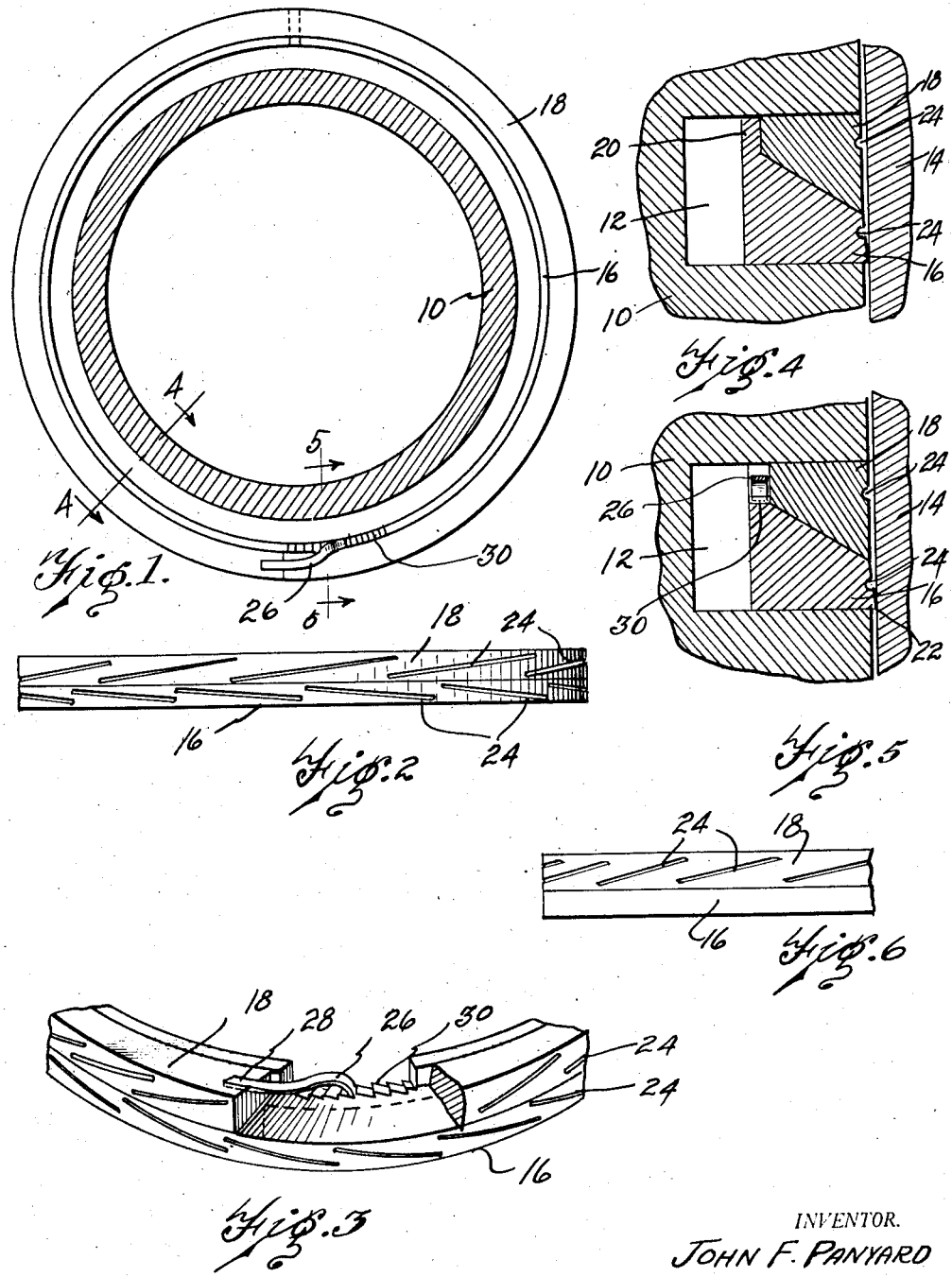

1,586,575

UNITED STATES PATENT OFFICE.

JOHN F. PANYARD, OF DETROIT, MICHIGAN.

PISTON PACKING.

Application filed October 19, 1925. Serial No. 63,332.

My invention relates to improvements in piston packing, and particularly to that type of packing wherein a ring section having a helical axial face is rotatably disposed within the groove in the piston whereby upon rotation in a given direction it is wedged against the side wall of the groove, and an object is to provide in a packing of the character described a ring section having helical grooves formed on its cylinder wall engaging face adapted to impart a rotatable impulse to the ring section during the piston reciprocation, and a meritorious feature is the provision in conjunction with the mechanism above set forth of means adapted to prevent rotation of the ring section in one direction.

An additional advantageous object is the employment in a piston packing groove of the usual construction of a pair of ring sections having helical meeting faces whereby upon relative rotation the packing is wedged against the side walls of the groove, each of which ring sections has formed on its cylinder wall engaging face a plurality of relatively short helical grooves adapted to impart during the reciprocation of the piston a rotatable impulse to the ring sections to wedge them axially within the groove in the piston. The helical grooves on the outer periphery of one ring section extend in a direction opposite to that of the helical grooves on the other ring section. Furthermore, suitable means is provided engaging the ring sections to hold them against relative rotation in a given direction adapted to function at different positions of relative rotation to which the rings have been adjusted and adapted to permit relative rotation of the ring sections in one direction.

The above objects and other advantages of my invention will more fully appear from the following description, appended claims and accompanying drawings, in which:—

Figure 1 is a cross-sectional view through a piston provided with packing embodying my invention.

Fig. 2 is a side elevation of packing ring structure embodying my invention.

Fig. 3 is a perspective broken away of a portion of the ring structure shown in Fig. 2.

Fig. 4 is a cross-sectional view taken on line 4—4, Fig. 1.

Fig. 5 is a cross-sectional view taken on line 5—5, Fig. 1.

Fig. 6 is a fragmentary elevation of a modified form of my invention.

As illustrated in the accompanying drawing, let 10 indicate a piston having a packing groove 12 and 14 a portion of the side wall of the cylinder within which the piston is mounted for reciprocation.

A preferred form of my invention consists in the employment of a pair of ring sections indicated in the drawings as 16 and 18. I have shown ring section 16 as having a base flange 20 which extends underneath the ring section 18 and I also prefer to construct ring section 16 so that its normal diameter is greater than the normal diameter of ring section 18 and its outer face is cut away as indicated in Figs. 4 and 5 so that it has an edge portion 22 which is adapted to initially engage the cylinder wall to the exclusion of the remaining cylinder wall engaging face of the ring section to wear within a limited period of use after which the packing completely engages the cylinder wall. This edge forms a quick seating face for the packing. I have not provided any expansion spring to hold the packing outwardly against the cylinder wall but depend rather upon the inherent expansive quality of the ring sections, though obviously the result would be the same were a spring provided.

Each ring section has formed on its cylinder wall engaging face a plurality of short helical grooves 24 which terminate short of the axial faces of the ring sections. The grooves 24 formed on ring section 18 extend in the opposite direction to the groove 24 formed in ring section 16. During the working movement of the piston in the cylinder oil collects in these grooves and due to their helical character they exert an impulse of rotation to each ring section tending to expand the packing axially within the groove in the piston.

In connection with the improvements set forth above, I make use of a locking device adapted to automatically lock the two ring sections against relative rotation in a given direction and at different positions of rotatable adjustment. As illustrated, this locking means consists in a spring member 26 secured at 28 to ring section 18. The free end of this spring member 26 engages in notches 30 formed on the end section 16. As shown in Fig. 3, these notches are so formed that while rotation of ring section 16 relative to ring section 18 is permitted in one direction it is restrained in the opposite direction.

In Fig. 6, I have shown a modified form of construction in which one ring section only is provided with a face having helical cylinder wall engaging grooves. This construction would produce rotation of the one ring section but it would represent a minimum amount of rotation as compared with the maximum amount obtained by both ring sections being grooved.

What I claim is:

1. In piston packing, a piston having a groove for packing, packing in said groove consisting of a rotatable ring section having a helical axial face, said groove provided with a helical meeting face, said ring provided with a helical groove on its cylinder wall engaging face adapted to impart a rotatable impulse to the ring during piston reciprocation.

2. In piston packing, a piston having a groove for packing, packing in said groove consisting of a pair of rotatable sections having helical meeting faces whereby relative rotation in a given direction increases the axial dimension of the packing, one of said ring sections provided with angularly extending grooves formed in its cylinder wall engaging face.

3. In piston packing, a piston having a groove for packing, packing in said groove consisting of a pair of rotatable sections having helical meeting faces whereby relative rotation in a given direction increases the axial dimension of the packing, each ring section provided with angularly extending grooves formed in its cylinder wall engaging face, the grooves in one section extending angularly with respect to the grooves in the other section.

4. In piston packing, a piston having a groove for packing, packing in said groove consisting of a pair of rotatable sections having helical meeting faces whereby relative rotation in a given direction increases the axial dimension of the packing, each ring section provided with a plurality of short helical grooves in its cylinder wall engaging face, the grooves of one section extending angularly with respect to the grooves of the other section.

5. In piston packing, a piston having a groove for packing, packing in said groove consisting of a pair of rotatable sections having helical meeting faces whereby relative rotation in a given direction increases the axial dimension of the packing, each ring section having a helical groove in its cylinder wall engaging face, the helical groove in one section extending in the opposite direction to the helical groove in the other ring section.

6. In piston packing, a piston having a groove for packing, packing in said groove consisting of a pair of rotatable sections having helical meeting faces whereby relative rotation in a given direction increases the axial dimension of the packing, each ring section provided with angularly extending grooves formed in its cylinder wall engaging face, the grooves in one section extending angularly with respect to the grooves in the other section, and means engaging the ring sections to prevent relative rotation in a given direction.

7. In piston packing, a piston having a groove for packing, packing in said groove consisting of a pair of rotatable sections having helical meeting faces whereby relative rotation in a given direction increases the axial dimension of the packing, each ring section having a plurality of helical grooves formed in its cylinder wall engaging face, the helical grooves in the one ring section extending in the opposite direction to the helical grooves in the other ring section, and means engaging the ring sections to hold them against relative rotation to diminish the axial dimension of the packing while permitting relative rotation in the opposite direction.

8. In piston packing, a piston having a groove for packing, packing in said groove consisting of a pair of rotatable sections having helical meeting faces whereby relative rotation in a given direction increases the axial dimension of the packing, each ring section having a plurality of helical grooves formed in its cylinder wall engaging face, the helical grooves in the one ring section extending in the opposite direction to that of the helical grooves in the other ring section, and a spring member carried by one ring section engaging the other ring section to hold the ring section against relative rotation in a given direction.

9. In piston packing, a piston having a groove for packing, packing in said groove consisting of a pair of rotatable sections having helical meeting faces whereby relative rotation in a given direction increases the axial dimension of the packing, each ring section having a plurality of helical grooves formed in its cylinder wall engaging face, the helical grooves in the one ring section extending in the opposite direction to that of the helical grooves in the other ring section, and a spring member carried by one ring section engaging the other ring section to hold the ring section against relative rotation in a given direction while permitting relative rotation in the opposite direction.

10. In piston packing, a piston having a groove for packing, packing in said groove consisting of a rotatable ring section having a helical axial face, said groove provided with a helical meeting face, said ring provided with a helical groove on its cylinder wall engaging face adapted to impart a rotatable impulse to the ring during piston reciprocation, and means engaging said ring to prevent rotation in a given direction.

11. In piston packing, a piston having a groove for packing, packing in said groove consisting of a rotatable ring having a helical axial face, said groove provided with a helical meeting face, said ring provided with a helical groove on its cylinder wall engaging face adapted to impart a rotatable impulse to the ring in a given direction during piston reciprocation, and means engaging said ring section to hold the same against rotation in the opposite direction.

12. In piston packing, a piston having a groove for packing, packing in said groove consisting of a rotatable ring having a helical axial face, said groove provided with a helical meeting face, said ring provided with a helical groove on its cylinder wall engaging face adapted to impart a rotatable impulse to the ring in a given direction during piston reciprocation, and means engaging said ring to hold it against rotation in a given direction at different positions to which it has been rotated within the groove.

13. In piston packing, a piston having a groove for packing, packing in said groove comprising a rotatable ring having a helical axial face and provided on its cylinder wall engaging face with a helical groove terminating short of each axial face, said piston packing groove having a helical face opposed to the helical face of the ring.

14. In piston packing, a piston having a groove for packing, packing in said groove consisting of a pair of rotatable sections having helical meeting faces whereby relative rotation in a given direction increases the axial dimension of the packing, each ring section provided with helical grooves on its cylinder wall engaging face, which grooves are closed at the ends, the grooves on one ring section extending in the opposite direction to that of the grooves on the other ring section.

In testimony whereof, I sign this specification.

JOHN F. PANYARD.